W. E. FRANKLIN.
RAIL FASTENING.
APPLICATION FILED FEB. 24, 1912.
1,039,374.
Patented Sept. 24, 1912.
7 SHEETS—SHEET 1.
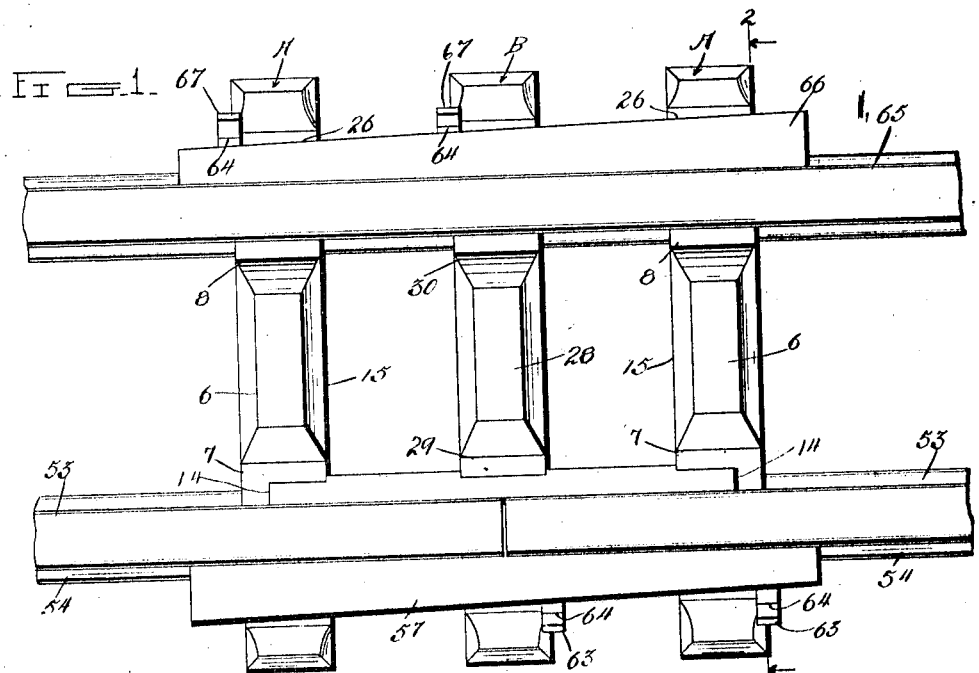
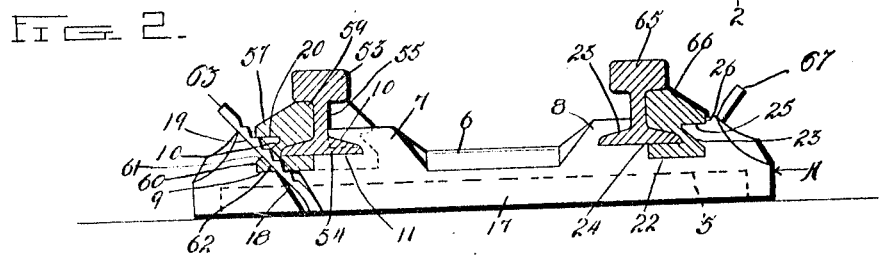
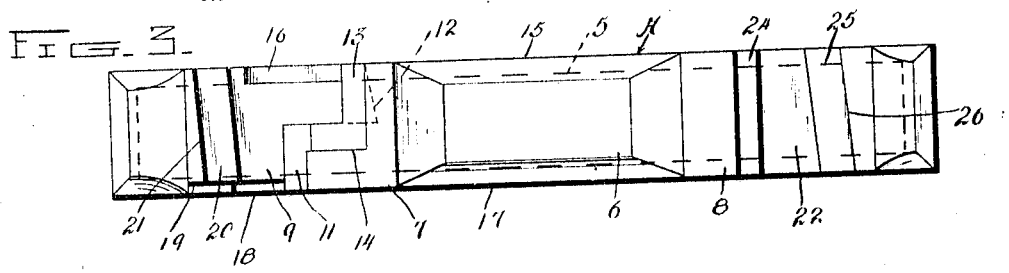

W. E. FRANKLIN.
RAIL FASTENING.
APPLICATION FILED FEB. 24, 1912.
1,039,374.
Patented Sept. 24, 1912.
7 SHEETS—SHEET 2.
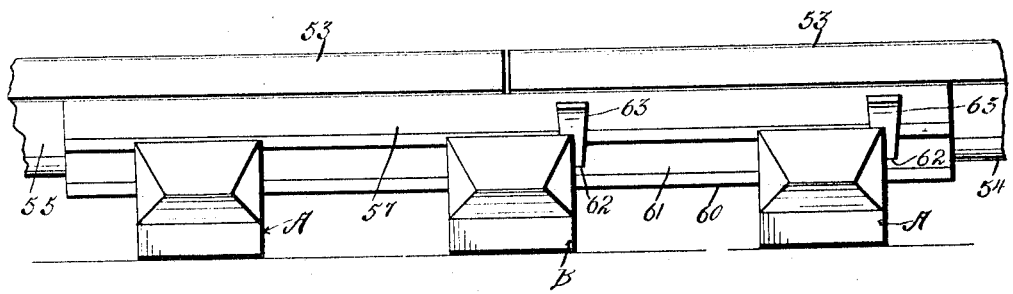
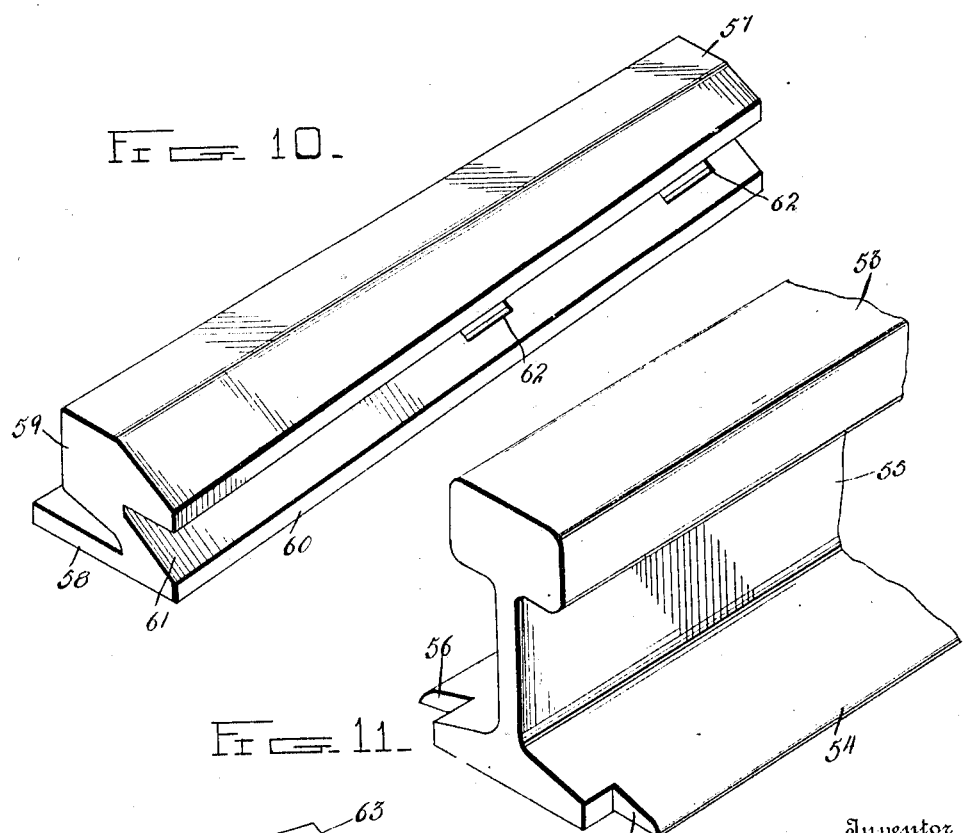
Inventor
W. E. Franklin W. E. FRANKLIN.
RAIL FASTENING.
APPLICATION FILED FEB. 24, 1912.
1,039,374.
Patented Sept. 24, 1912.
7 SHEETS—SHEET 3.
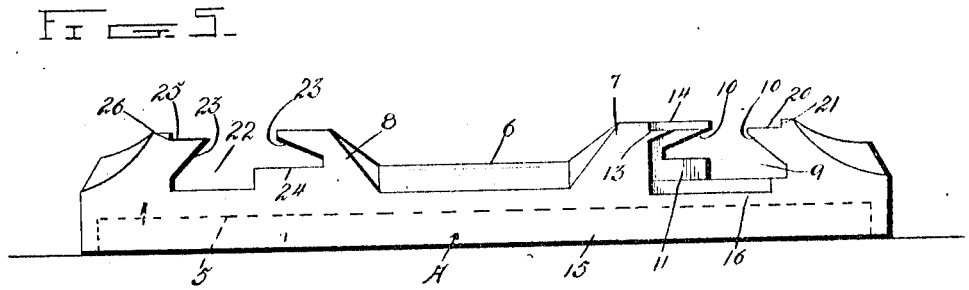
Fig. 5.
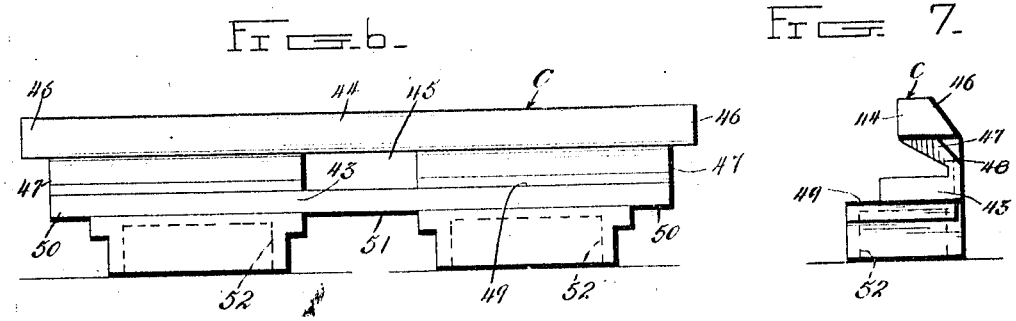
Fig. 6.   Fig. 7.
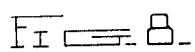
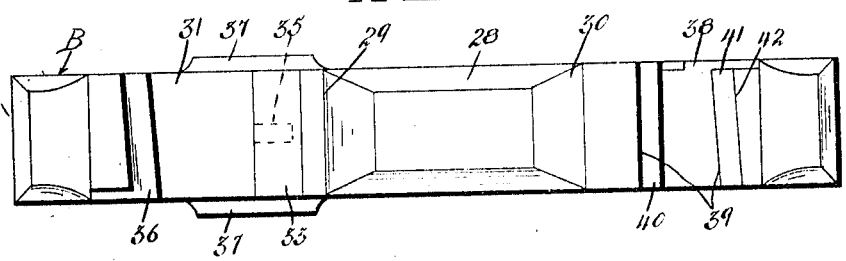
Fig. 8.
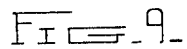
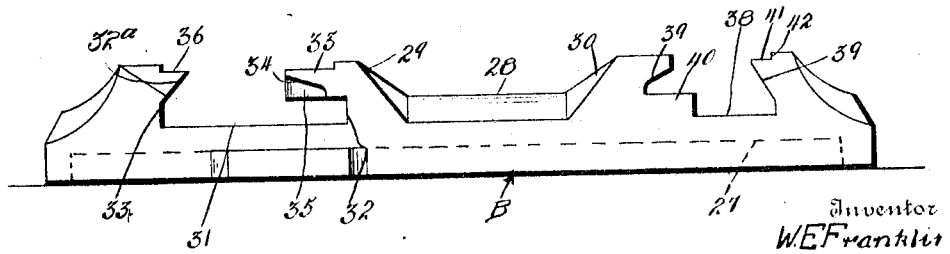
Fig. 9.
Inventor
W E Franklin
Witnesses
By
Attorneys

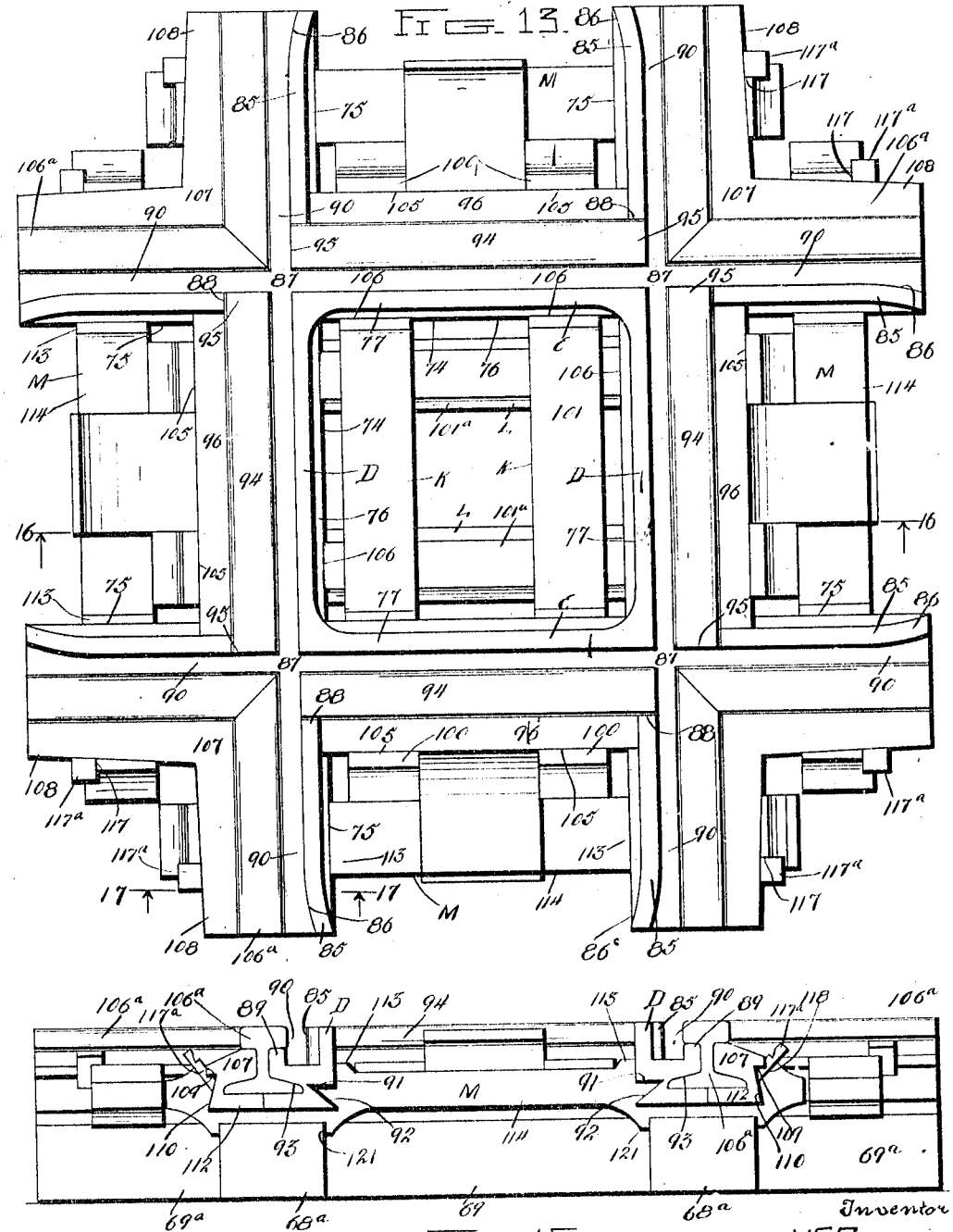

W. E. FRANKLIN.
RAIL FASTENING.
APPLICATION FILED FEB. 24, 1912.
1,039,374.
Patented Sept. 24, 1912.
7 SHEETS—SHEET 5.
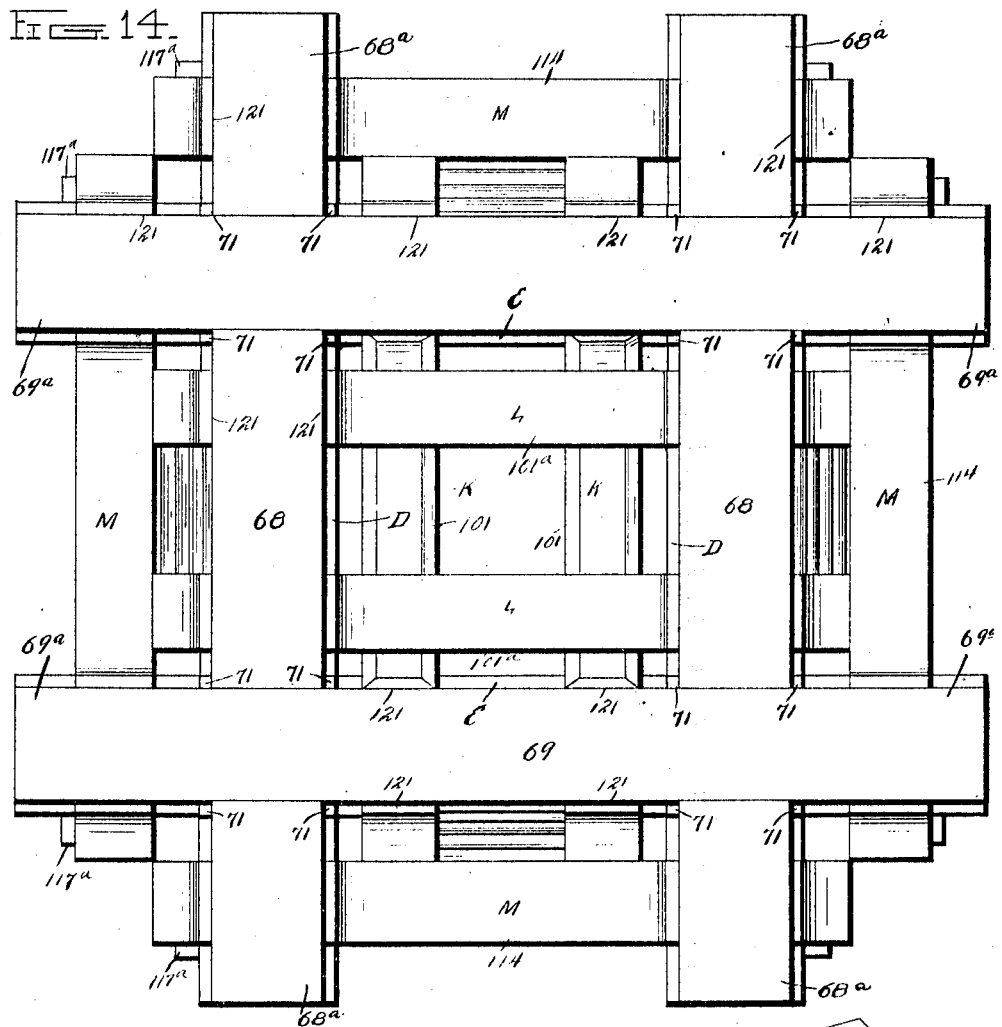
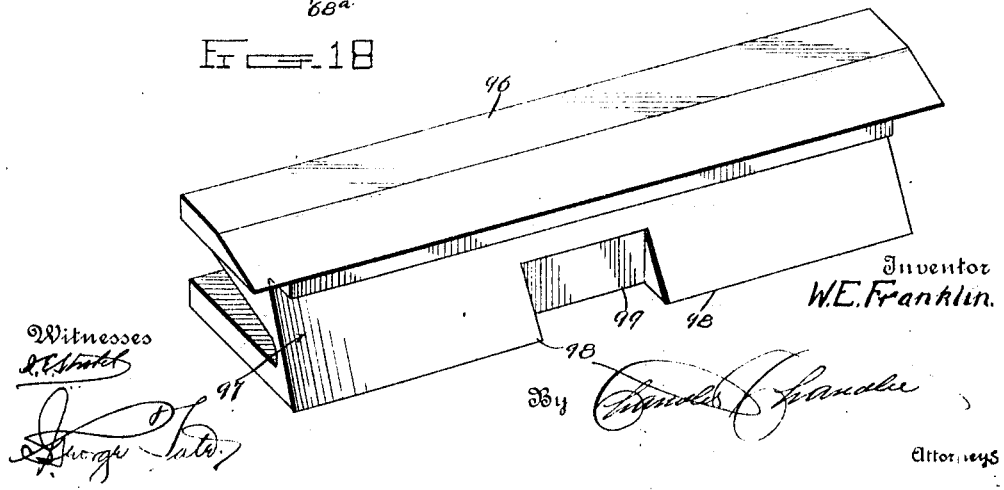
Witnesses
Inventor
W.E.Franklin.
By
Attorneys

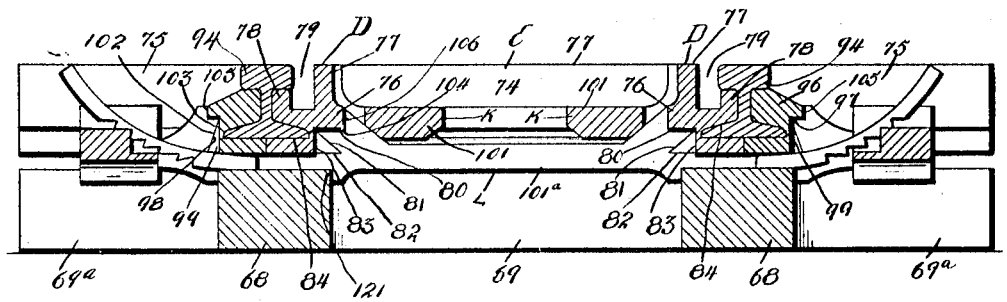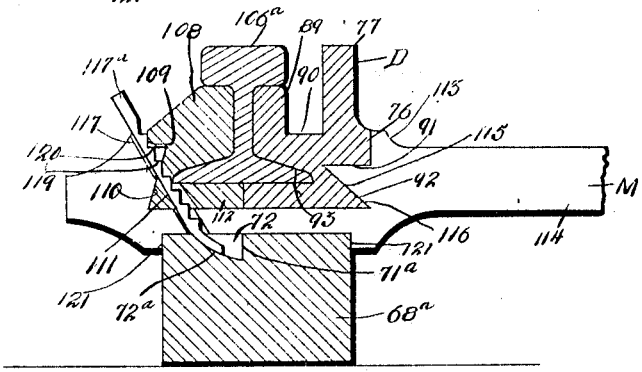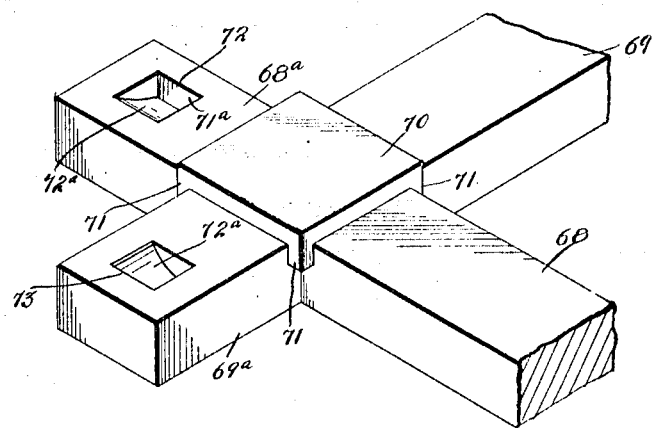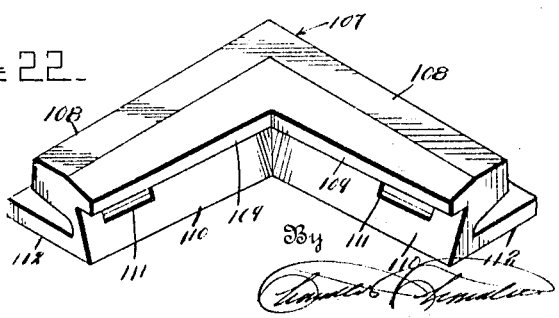

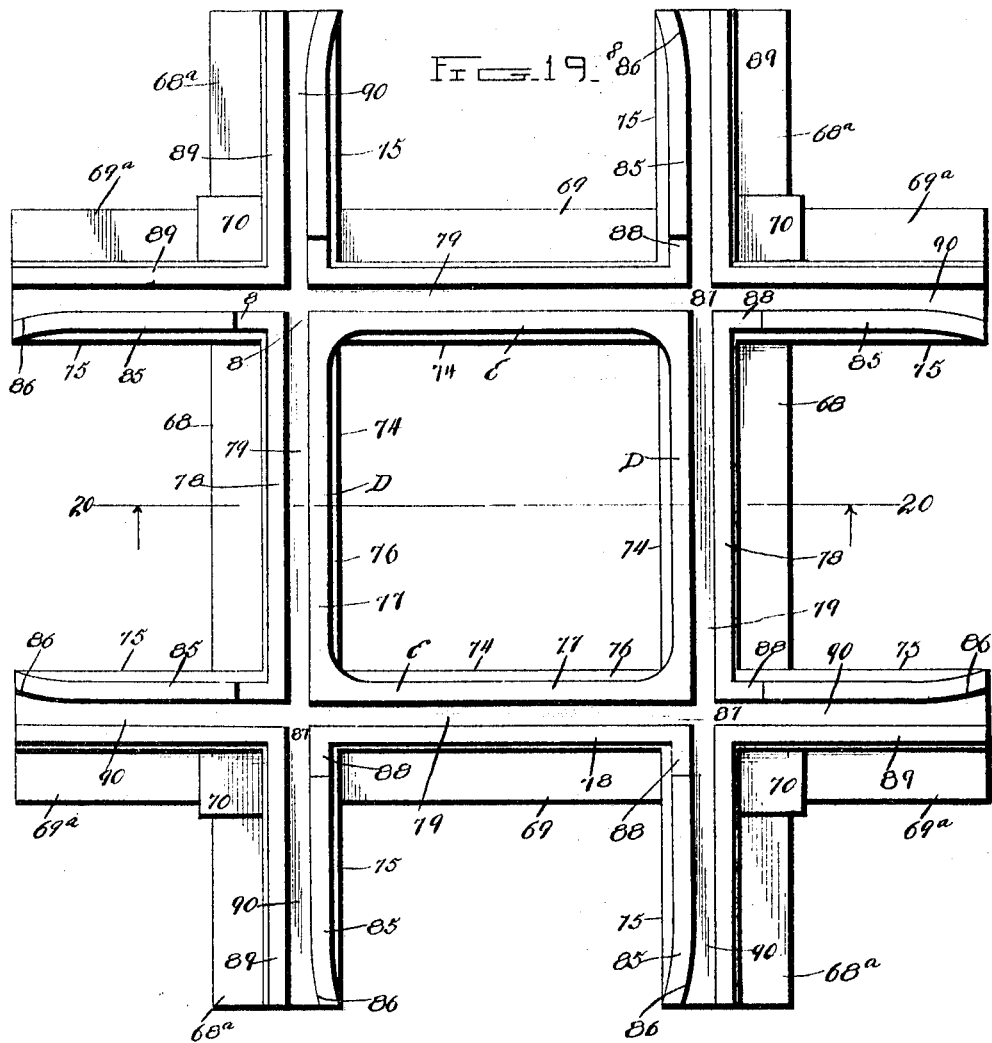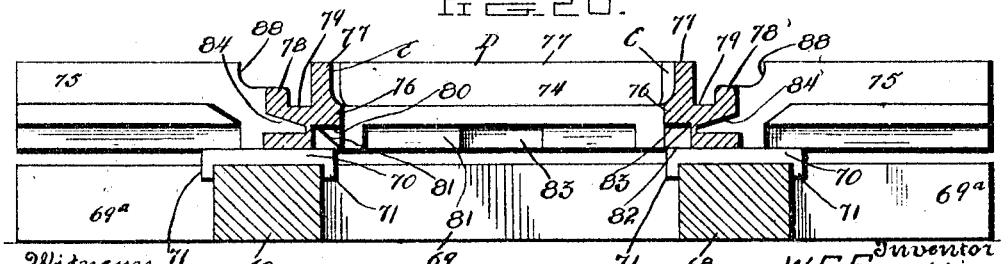

UNITED STATES PATENT OFFICE.

WILLIAM E. FRANKLIN, OF CROSSNORE, NORTH CAROLINA.

RAIL-FASTENING.

1,039,374.  Specification of Letters Patent.  Patented Sept. 24, 1912.

Application filed February 24, 1912. Serial No. 679,648.

*To all whom it may concern:*

Be it known that I, WILLIAM E. FRANKLIN, a citizen of the United States, residing at Crossnore, in the county of Avery, State of North Carolina, have invented certain new and useful Improvements in Rail-Fastenings; and I do hereby declare the following to be a full, clear, and exact description of the invention, such as will enable others skilled in the art to which it appertains to make and use the same.

This invention relates to an improvement in rail fastenings.

The principal object of the invention is to provide a novel means for securing rails upon ties without the use of either bolts or spikes.

Another object of the invention is to provide a novel means for clamping the rails, whereby said rails will be prevented from lateral creeping.

A further object of the invention is to provide a plurality of ties of novel construction adapted to be positioned under the meeting ends of rails, and a novel means associated with said ties for effectually clamping the rails thereto.

Another object of the invention is to provide a plurality of ties for the purpose above described and a novel form of splice bar associated therewith, whereby the ties and the splice bar will conjointly form a substantially solid base for the meeting ends of the rails.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a top plan view of the preferred form of my invention, showing my improved means for securing rails upon a plurality of ties, Fig. 2 is a transverse section taken on the line 2—2 of Fig. 1, Fig. 3 is a top plan view of one of the outer ties shown in Fig. 1, Fig. 4 is a side elevation of the structure shown in Fig. 1, Fig 5 is a side elevation of the inner side of the outer tie, Fig. 6 is a side elevation of the inner splice bar, Fig. 7 is an end view thereof, Fig. 8 is a top plan view of the intermediate tie, Fig. 9 is a side elevation thereof, Fig. 10 is a perspective view of one of the wedge-blocks, Fig. 11 is a detail perspective view of the meeting end of one of the rails, Fig. 12 is a perspective view of the locking teeth, Fig. 13 is a top plan view showing a modified form of my invention, the view illustrating a railway crossing, Fig. 14 is a bottom plan view of the rear crossing structure, the cross ties being removed, Fig. 15 is an end view thereof, Fig. 16 is a sectional view taken on the line 16—16 of Fig. 13, Fig. 17 is an enlarged detail sectional view taken on the line 17—17 of Fig. 13, Fig. 18 is a perspective view of one of the rail clamping bars, Fig. 19 is a top plan view of the crossing frame, Fig. 20 is a cross sectional view taken on the line 20—20 of Fig. 19, Fig. 21 is a perspective view of one corner of the cross tie showing the spacing block secured thereto, Fig. 22 is a perspective view of one of the angle wedge-blocks.

Like reference numerals designate corresponding parts in all the figures of the drawings.

Referring to the drawings and more particularly to Figs. 1 to 11 inclusive, there is shown a set of ties which are disposed under the track rails and at the meeting ends of one pair of rail sections, each set comprising spaced outer ties A—A and an intermediate tie B, which is spaced from the said outer ties. Inasmuch as the constructions of the outer ties A are identical, the description of one thereof is deemed to be sufficient. Each outer tie consists of a body portion having a longitudinal channel 5 formed in its undersurface for receiving dirt or other ballast to prevent movement in any direction of said tie. The central portion of the top of the tie is recessed, as indicated by the reference numeral 6, to form consequent raised ends 7 and 8 respectively. Formed in the raised end 7 is a transverse dovetailed slot 9 forming consequent overhanging walls 10—10, the outer wall being disposed at an inclination for a purpose hereinafter described. Integral with the body of the tie and projecting into the slot 9 from the inner wall thereof, is a step 11, which is disposed at one side of said recess. The inner wall 10 opposite the step 11 is recessed, as indicated by the reference numeral 12, as clearly shown in Fig. 3 of the drawings. Formed in the top face above the inner wall 10 is an angular recess 13 forming a consequent shoulder 14. The inner wall 15 of the tie is formed with a longitudinal recess 16 which merges with the dove-tailed slot 9. Formed in the outer wall 17 of the tie and merging with the bottom of the slot 9 is an inclined groove 18, and formed in the outer wall of the raised end 7 is an inclined groove 19, which is disposed at an obtuse angle to said groove 18. Formed in the outer end of the raised end 7 opposite the recess 13 is a transverse recess 20, which merges with the dove-tailed slot 9, and has its transverse edge 21 inclined parallel to the inclined outer wall 10 of said slot 9. Formed in the raised end 8 of the tie is a transverse dove-tailed slot 22 forming consequent overhanging walls 23—23, the outer wall being disposed at an inclination for a purpose hereinafter described. Projecting into the slot 22 from the inner wall thereof is a step 24, which extends transversely across said tie. Formed in the top of the outer end of the raised end 8 is a transverse recess 25 which merges with the dove-tailed slot 22, and has its transverse edge 26 inclined parallel to the inclined outer wall of said slot 22. The intermediate tie B consists of a body portion having a longitudinal channel 27 formed in its base. The central portion of the top of the tie is recessed, as indicated by the reference numeral 28, to form consequent raised ends 29 and 30 respectively, said ends being respectively disposed in alinement with the raised ends 7 and 8 of each tie A. Formed in the raised end portion 29 is a transverse slot 31 forming a consequent vertical inner wall 32 and an overhanging outer end wall 32ª. Projecting forwardly from the inner end wall 32 is a transverse tongue 33 having an undercut end 34. Centrally projecting from the end 34 is a stop 35. The outer end wall 32ª is transversely inclined to register with the outer end walls 10 of the ties A. Formed in the top of the outer end of the raised end 29 is a transverse recess 36 which merges with the dovetailed slot 31, and is disposed parallel to the inclined outer wall 33 of said slot. Extending laterally from the opposite sides of the tie and below the slot 31 are projections 37—37. Formed in the raised end 30 of the tie is a transverse dove-tailed slot 38 forming consequent overhanging walls 39—39, the outer wall being disposed at an inclination for a purpose hereinafter described. Projecting into the slot 38 from the inner wall thereof is a step 40 which extends transversely across said tie. Formed in the top of the outer end 30 is a transverse recess 41 which merges with the slot 38, and has its transverse edge 42 inclined parallel to the inclined outer wall of said slot 38.

Associated with the ties A and B and respectively seated within the dove-tailed slots 9 and 31 is a splice bar C. This bar consists of a base 43, which is seated upon the bottoms of said transverse slots and against the inner walls thereof. Integral with the base and upwardly extending from the inner edge thereof is a web-engaging flange 44. This flange is centrally formed with an opening 45 to receive the tongue 33 of the intermediate tie B. It will be observed in this connection that the stop 35 projects forwardly beyond the flange and above the base. Each end 46 of the flange 44 projects beyond each end 47 of the base 43, and is adapted to be seated within the angular recesses 13 of the ties A, the ends 47 abutting the inner side wall of the steps 22 of said ties. The inner side of each end of the base is formed with an inclined projection 48 adapted to be seated within a respective recess 12 of the ties A. The base 43 is formed with a longitudinal recess 49, the bottom thereof being disposed flush with the bottom of the dove-tailed slots 9 and 31 of the ties A and B, and the vertical wall parallel with the forward edge of the steps 11 of the outer ties A. Each end of the base is transversely recessed to form a consequent tongue 50 adapted to be seated upon the bottom of the transverse slots 9, and is also centrally recessed, as indicated by the reference numeral 51, to receive the bottom of the transverse slot 31 of the intermediate tie B. The base 43 projects downwardly between the ties A and B, and each projection is formed with a recess 52 in its underface, the bottom edges of said projections being arranged flush with the bottom edges of the ties A and B.

Adjacent rail sections 53—53 each has its base 54 seated upon the base 43 of said splice bar, and its web 55 bearing against the web-engaging flange 44, of said bar. The meeting end of each section is notched, as indicated by the reference numerals 56—56, for engaging on opposite sides of the stop 35. It will be observed in this connection that the meeting ends of the sections are disposed directly above the center of the intermediate tie B. In order to securely lock said sections against lateral displacement, there is provided a second splice bar, which is designated as a whole by the reference numeral 57. This splice bar consists of a base 58 and an overhanging flange 59. The longitudinal edge 60 of the bar opposite the flange 59 is longitudinally inclined so that the bar is thereby formed with a smaller end and a larger end. Formed in this edge is a longitudinal groove 61, and formed in the small end of the bar is an opening 62 which communicates with the groove 61 and with the base 58. This bar is disposed within the slots 9 of the ties A and the slot 31 of the tie B between the outer walls thereof and the rail sections, and by reason of the inclined wall 60 of said bar bearing against the inclined walls of the slots, the said bar will be forced to tightly clamp the rail sections when said bar is forced inwardly. When the bar is thus driven home, the opening 62 thereof will register with the slots 18 and 19 of the first mentioned tie. In order to lock these parts together, there is provided a flat wedge-shaped pin 63, which is formed with a series of transverse teeth 64 on one of its flat faces. The smaller end of this pin is inserted through the recess 19 into the opening 62 of the bar, and is then driven inwardly until the said smaller end engages the wall of the slot 19. The teeth 64 of the pin will engage the top edge of the groove 61 of the bar and thereby prevent accidental displacement of said pin. It will thus be observed that by reason of the slot 18 being disposed at an angle to that of the slot 19, the smaller end of the pin will be caused to engage the inner wall of said slot 18, and thereby tend to bend the pin, and as a result, cause the pin to be frictionally locked. As the pin is driven home, as above described, the said pin will tend to draw the bar along by reason of the wedge-shaped construction of said pin, and thereby cause the rail sections to be tightly clamped between said splice bars.

A single rail section 65 is disposed within the slots 22 of the outer ties A and the slot 38 of the intermediate tie B in such a manner that the base of said section is seated upon the steps 11 and 40 of said ties. A wedge-block 66 identical in construction to the splice bar 57 is disposed within said slots between the outer ends of the ties and the said section, and locking pins 67 are associated with the smaller end thereof and with the ties in a manner similar as above described for locking said block 66 against movement.

In the modified form of my invention, as disclosed in Figs. 13 to 22 inclusive, there is shown a novel construction of railway crossings. In this form of the invention there are provided crossed pairs of ties 68—68 and 69—69 respectively, the ends 68ª and 69ª of each pair of ties projecting beyond the respective cross ties. Seated upon the ties at their intersections are angular spacing blocks 70. These blocks are formed of any suitable material, and are each provided with depending lugs 71 which project from each corner thereof for engagement with adjacent side walls of each adjacent cross tie and thereby retain said block against lateral movement in any direction. Formed in the upper faces of each of the extensions 68ª and 69ª of the ties are recesses 72 and 73 respectively. The recesses of each pair of ties are formed with a vertical inner wall 71ª and a downwardly inclined bottom 72ª.

Seated upon the spacing blocks 70 is a skeleton rail chair frame consisting of spaced pairs of crossed members D—D and E—E, the ends of each pair of members projecting beyond the other pair of said members. This frame is of a size corresponding to the crossed ties. Each member of the frame is identical in construction and therefore the description of one of said members is deemed to be sufficient.

Each member consists of a central portion 74 and end portions 75—75. The central portion 74 is disposed between a pair of members and the end portions respectively project beyond said pair of members. Each member consists of a body portion 76, and extending upwardly from the inner wall of the central portion 74 is a longitudinal flange 77. Extending upwardly from the outer wall of the central portion 74 is a bead 78, the flange and the bead being spaced apart to form a longitudinal slot 79. Formed in the lower portion of the inner wall of the central portion 74 is a longitudinal groove 80 having an inclined bottom 81 which merges with the base 82 of said member. Also formed in the lower portion of the inner wall of said central portion 74 is a central recess 83 which communicates with the base 82 of the member and the longitudinal groove 80. The outer wall of the body portion directly below the bead 78 is formed with a longitudinal recess 84.

Each end portion 75 of each member is formed with an upwardly extending longitudinal flange 85 and the outer end 86 of each flange is outwardly flared to freely receive the car wheels. These flanges 85 are disposed in alinement with the central flange 77, and formed in the inner end of each flange 85 is a transverse slot 87 which registers with the groove 79 of the adjacent cross member. Also formed in the inner end of each flange 85 adjacent the transverse slot 87 is a cut away portion 88 forming a seat, the bottom thereof being disposed in the same plane as the upper edge of the adjacent bead 78. Also upwardly projecting from each end portion 75 is a longitudinal bead 89, said bead being disposed in spaced relation to the flange 85 to form a consequent longitudinal groove 90, said bead 89 and groove 90 being disposed in alinement with the bead 78 and the groove 79 of the central portion 74. Formed in the lower portion of the inner face of each end portion 75 is an inwardly extending longitudinal groove 91 having an upwardly inclined wall 92. Formed in the outer face of each end portion 75 and directly below the bead 89 thereof is an inwardly extending longitudinal groove 93.

My invention further comprises four rail sections, each section being indicated as a whole by the reference numeral 94. Each rail section is associated with each central portion 74 of each member of the chair frame, the inner base flange of the rail fitting within the longitudinal groove 84 and the inner edge of the tread resting upon the bead 78. Each rail section 94 has its tread portion 95 projecting beyond the base and web at either end and seated upon the respective seats 88. Disposed against the outer face of each rail section 94 is a clamping bar 96 having its inner face correspondingly formed to receive the adjacent base flange of said rail. The outer face of each of these bars 96 is formed with a longitudinal groove 97 having an inclined wall 98 which merges with the bottom of the bar and extends longitudinally of said bar. Centrally formed in the lower edge of the outer face is a recess 99 which registers with the recess 83 of the adjacent central portion 74.

The invention further comprises opposed pairs of rail clamping bars K—K and L—L respectively. The bars K each include end portions 100—100 and a raised connecting portion 101. Formed in each end portion 100 is a transverse dove-tailed slot 102, the upper edges of the walls thereof merging with an outer transverse cut-out portion 103 and an inner transverse cut-out portion 104 which respectively form transverse shoulders 105 and 106. These bars are adapted to clamp an opposed pair of rail sections 94 to the adjacent central portions 74 of the frame and the respective clamping bars 96 to said rail sections. In positioning the rail clamping bars K, they have their ends respectively seated within the recesses 83 of the central portion 74 and the recesses 98 of the clamping bars 96. These bars K are then slid laterally on either side of said recesses. The rail clamping bars L—L are identical in construction with the rail clamping bars K with the exception that the central portions 101ª are not raised, and are consequently disposed below the central portions 101 of the bars K and at right angles thereto.

My invention further comprises a plurality of angle rails 106ª which are each disposed against the outer faces of adjacent extensions 75 of said frame. Associated with each of these angle rails is an angle rail clamp 107, including arms 108—108, the outer faces 109 of each arm tapering from the angle to the free end thereof and formed with an upwardly and inwardly inclined longitudinal wall 110. Formed in each arm 108 adjacent the outer end thereof is an inclined opening 111 which communicates with the inclined wall 110 and with the base 112 of said arm, and registers with an opening 73 of a respective cross tie 68ª. In order to secure the angle rails 106ª and the angle rail clamping bars 107 in position, there are provided a plurality of clamping bars M. Each of these bars is formed with raised ends 113—113 and a central portion 114. A dove-tailed slot 115 is formed in each end, and this slot includes an inclined transverse outer wall 116 adapted to fit the outer faces of the arms 108 of the angle clamp. Formed in the outer faces of these clamping bars M adjacent the outer end thereof are inclined grooves 117—118 respectively. These grooves register with the openings 111 of said angle clamping bar 108. A wedge-shaped flat pin 117ª is projected through an opening 111, through the grooves 117 and 118, and has its free end projecting into an opening 73 of the cross tie. The upper face of this pin is formed with a series of transverse teeth 119 which are adapted to engage a shoulder 120 formed by the inclined outer wall 110 of the rail clamping member. As these pins are driven home, the rail clamping bars with which they contact will be shifted laterally to bind the angle rail clamps 107 tightly against the angle rail, and thereby hold the same against movement. Formed in the base portions of the clamping bars K, L and M at either end thereof are transverse recesses 121 which are adapted to receive the cross ties 68, and thereby hold the crossing in its entirety from lateral movements.

What is claimed is:

1. In a railway track structure, the combination with a pair of spaced parallel rail sections, of a transverse member having slots for respectively receiving said sections, one side of the member being formed with an inclined groove, an element disposed in one of the slots of the member against the inner wall thereof for receiving a respective rail section, a wedge-shaped rail clamp disposed within the last mentioned slot and between the outer wall thereof and the rail section, the smaller end of the clamp being formed with an opening registering with the groove of the transverse member, said clamp and member being respectively movable one with the other, and a wedge-shaped key disposed within said opening and slot for locking the member, element and rail section against lateral movement.

2. In a railway track structure, the combination with a pair of spaced parallel rail sections, of a transverse member having slots for respectively receiving said sections, one side of the member being formed with an inclined groove, an element disposed in one of the slots of the member against the inner wall thereof for receiving a respective rail section, a wedge-shaped rail clamp disposed within the last mentioned slot and between the outer wall thereof and the rail section, the smaller end of said clamp being formed with an elongated opening registering with the groove of the transverse member, said clamp and member being respectively movable one with the other, and a flat wedge-shaped key disposed within said opening and slot for locking the member, element and rail section against lateral movement, said key being formed on its upper face with a series of transverse teeth adapted for engagement with said clamp.

3. In a railway track structure, the combination with a pair of spaced parallel rail sections, of a transverse member having slots for respectively receiving said sections, said slots being each formed to provide a transverse overhanging inner wall and an inclined overhanging outer wall, one side of the member being formed with an inclined groove, an element disposed in one of the slots of the member against the inner wall thereof for receiving a respective rail section, a rail clamp disposed within the last mentioned slot between the outer wall thereof and the rail section, the outer face of the clamp tapering longitudinally toward the grooved side of the member, the smaller end of said clamp being formed with a downwardly inclined opening registering with the groove of the member, and a wedge-shaped key disposed within said opening and slot for locking the member, element and rail section against lateral movement.

4. In a railway track structure, the combination with a pair of spaced parallel rail sections, of a transverse member having slots for respectively receiving said sections, said slots being each formed to provide a transverse overhanging inner wall and an inclined overhanging outer wall, one side of the member being formed with an inclined groove, an element disposed in one of the slots of the member against the inner wall thereof for receiving a respective rail section, a rail clamp disposed within the last mentioned slot between the outer wall thereof and the rail section, the outer face of the clamp tapering longitudinally toward the grooved side of the member and formed with a longitudinal groove forming an inclined wall and a resultant shoulder, the smaller end of said clamp being formed with a downwardly inclined opening disposed at an angle to and registering with the groove of the member, and a wedge-shaped key disposed within said opening and slot for locking the member, element and rail section against lateral movement, said key being formed on its upper face with a series of transverse teeth adapted for engagement with the shoulder of the rail clamp.

5. In a railway structure, the combination with a pair of spaced ties respectively having transverse slots formed in each end, one of said ties being formed with an inclined groove, of a splice bar seated at its ends in certain of the slots of the ties, a wedge-shaped element associated with the last mentioned slots of the ties for clamping a rail section against the splice bar, the smaller end of the element being formed with an opening, and a wedge-shaped key disposed within the groove of the tie to draw said element longitudinally.

6. In a railway structure, the combination with a pair of spaced outer ties respectively having transverse slots formed near each end, of an intermediate tie having transverse slots formed therein and arranged in alinement with the slots of the outer tie, a splice bar seated within one of the slots of the intermediate tie and having interlocking engagement with said tie, the outer ends of the bar being respectively seated within the alined slots of the outer ties, and a wedge-shaped element associated with the last mentioned alined slots of the ties for clamping a rail section against the splice bar.

7. In a railway structure, the combination with a pair of spaced outer ties respectively having transverse slots formed near each end, of an intermediate tie having transverse slots formed therein and arranged in alinement with the slots of the outer tie, a splice bar seated within one of the slots of the intermediate tie and having interlocking engagement with said tie, the outer ends of the bar being respectively seated within the alined slots of the outer ties, a wedge-shaped element associated with the last mentioned alined slots of the ties for clamping a rail section against the splice bar, and locking means for said element.

8. In a railway structure, the combination with a pair of spaced outer ties respectively having transverse slots formed near each end, of an intermediate tie having transverse slots formed therein and arranged in alinement with the slots of the outer tie, a splice bar seated within one of the slots of the intermediate tie and having interlocking engagement with said tie, the outer ends of the bar being respectively seated within the alined slots of the outer ties, a wedge-shaped element associated with the last mentioned alined slots of the ties for clamping a rail section against the splice bar, one of said ties being formed with an inclined groove, the smaller end of the element being formed with an opening, and a wedge-shaped locking pin disposed within the opening of the element and engageable with the groove of the tie for drawing said element longitudinally.

9. In a railway structure, the combination with a pair of spaced outer ties respectively having transverse slots formed near each end, of an intermediate tie having transverse slots formed therein and arranged in alinement with the slots of the outer tie, a splice bar seated within one of the slots of the intermediate tie and having interlocking engagement with said tie, the outer ends of the bar being respectively seated within the alined slots of the outer ties, a wedge-shaped element associated with the last mentioned alined slots of the ties for clamping a rail section against the splice bar, one of said ties being formed with an inclined groove, the smaller end of the element being formed with an opening disposed at an obtuse angle with respect to said groove, and a wedge-shaped locking key disposed within the opening of the element and engageable within the groove of the tie for drawing said element longitudinally, said locking key being formed on one face with a series of transverse teeth adapted to engage the element.

In testimony whereof, I affix my signature, in presence of two witnesses.

WILLIAM E. $\overset{\text{his}}{\times}$ FRANKLIN.
mark

Witnesses:
C. C. BURLESON,
N. A. BUCHANAN.